United States Patent
Boustany et al.

[11] 3,836,412
[45] Sept. 17, 1974

[54] PREPARATION OF DISCONTINUOUS FIBER REINFORCED ELASTOMER

[75] Inventors: Kamel Boustany; Aubert Yaucher Coran, both of Akron, Ohio

[73] Assignee: Monsanto Company, St. Louis, Mo.

[22] Filed: June 12, 1972

[21] Appl. No.: 261,712

Related U.S. Application Data

[63] Continuation-in-part of Ser. No. 29,033, April 16, 1970, Pat. No. 3,697,364.

[52] U.S. Cl................. 156/62.2, 117/72, 117/77, 117/100 A, 117/143 A, 161/170, 161/176, 264/108, 264/109
[51] Int. Cl................................. B32b 5/16
[58] Field of Search........... 156/62.2; 260/17.4 BB, 260/741, 746, 762; 264/108, 109; 152/357, 359, 361; 117/100 A, 143 A, 28, 72, 76 T, 77, 80, 119.6, 148; 161/162, 168, 170, 176, 59

[56] References Cited
UNITED STATES PATENTS

| | | | |
|---|---|---|---|
| 1,223,692 | 4/1917 | Halsey | 260/762 |
| 1,474,482 | 11/1923 | Lahey | 260/750 |
| 1,901,930 | 3/1933 | Pieper et al. | 117/100 A |
| 1,982,024 | 11/1934 | Rose et al. | 260/741 |
| 1,993,276 | 3/1935 | Murphy et al. | 260/741 |
| 2,180,906 | 11/1939 | Maywald et al. | 260/748 |
| 2,292,492 | 8/1942 | Thomsen | 57/162 |
| 2,548,757 | 4/1951 | Adams | 260/17.4 BB |
| 2,759,852 | 8/1956 | King | 117/72 |
| 2,781,147 | 2/1957 | Ruschman | 260/750 |
| 3,388,083 | 6/1968 | Kwok | 260/17.4 BB |

FOREIGN PATENTS OR APPLICATIONS

| 1,166,876 | 10/1969 | Great Britain | 260/746 |
|---|---|---|---|

OTHER PUBLICATIONS

Frenkel et al., Reinforcement of Rubbers with Various Fibres, Soviet Rubber Technology, July 25, 1966, pp. 24–26.

*Primary Examiner*—Daniel J. Fritsch

[57] ABSTRACT

Bonded composites of discontinuous organic fiber and vulcanized matrix are prepared by treating the fiber to reduce fiber to fiber interaction, dispersing the treated fiber and bonding ingredients into vulcanizable elastomeric matrix, positioning the fiber therein taking suitable precautions to minimize fiber breakage during the dispersing and positioning of the fiber, and vulcanizing the mixture to produce a bonded composite in which the organic fiber has an aspect ratio of at least about 20 but not more than about 350.

24 Claims, 7 Drawing Figures

TYPICAL STRESS−STRAIN CURVE

THE ARROWS (↓) DENOTE DIRECTION OF TEST OR FORCE.

(g)

DIRECTION OF FORCE $$E_r\left\{1+0.25\left(0.85\frac{\ell}{d}+26\right)C_f\left(\frac{1}{0.01+\text{SIN}\alpha}-0.75\right)\right\}$$

PREPARATION OF DISCONTINUOUS FIBER REINFORCED ELASTOMER

This application is a continuation-in-part of application Ser. No. 29,033 filed Apr. 16, 1970, now U.S. Pat. No. 3,697,364. The present invention relates to high modulus vulcanized composites of rubber and other elastomers having dispersed in the elastomeric matrix discontinuous cellulose fibers bonded to the matrix, to compositions comprising vulcanizable elastomeric matrix, short cellulose fibers and bonding agents which yield high modulus bonded composites upon vulcanization and to the preparation of such compositions and composites.

BACKGROUND OF THE INVENTION

Since its inception, the rubber industry has incorporated cellulose fibers into rubber as cheap fillers. Cellulose adds some stiffness and increases dimensional stability. The preparation of strong high modulus rubber vulcanizates by reinforcement with cheap cellulose fibers remained an intriguing possibility impeded by the difficulty of incorporating cellulose into rubber uniformly without injuring it. Cellulose fibers tend to cling together and remain in bundles upon mixing into massed rubber while the individual fibers and bundles break up into shorter lengths.

For a similarly long time cellulose fibers have been impregnated with rubber latex to prepare rubber treated cellulose articles. In the forepart of the centrury it was proposed to incorporate rubber coated cellulose fibers one-fourth inch or longer into massed rubber to overcome the disadvantage of clumping and breaking of the uncoated fibers, but the process was criticized as still leading to extensive fiber comminution. The paper and rubber art were further intertwined in a process wherein the function of the paper machine was reversed and cellulose fibers oriented thereon, treated with rubber latex, and the resulting rubberized fiber mat used as a substitute for a sheet of cords covered with frictioned rubber. Development of sophisticated synthetic fibers apparently diverted attention from common natural cellulose. Nevertheless, the preparation of elastomeric composites containing discontinuous elements of reinforcing cellulose fibers possesses a number of significant advantages. The strength and modulus of cellulose fibers are comparable to those of glass fibers. The manufacture of complex shaped articles is impractical or impossible from elastomers reinforced with continuous fibers but is easily accomplished from elastomers containing discontinuous fibers. Also, elastomers reinforced with short fibers are readily processed by simple extrusion and cellulose is a cheap source of short fibers. Accordingly, the attainment of discontinuous cellulose composites with sufficiently high modulus and strength to permit them to be substituted for uses heretofore filled by continuous fiber composites is an important advance in the art.

SUMMARY OF THE INVENTION

In accordance with this invention, composites of high modulus and strength are prepared containing discontinuous cellulose. It has been found that vulcanized elastomer having dispersed in the elastomer matrix discontinuous cellulose fiber bonded to the matrix, and having on the average an aspect ratio within the range of 20 to 350 comprise high modulus and high strength composites wherein the Young's modulus is ten times the matrix modulus or higher, and the yield strength of the bonded composite exceeds by more than 25 percent the yield strength of the corresponding unbonded composite. The fiber usually will be within the range of 2–75 percent by volume of the matrix. The modulus approaches a plateau before 75 percent volume loading and, if it is desired to orient the fiber in the matrix, a higher degree of orientation is obtainable at loadings of 5 percent by volume and above. In preferred aspects of the invention, vulcanizable diene rubber matrix having dispersed therein 10 to 45 percent by volume of discontinuous unregenerated cellulose fiber having on the average an aspect ratio within the range of 30 to 300, directionally oriented in the matrix and bonded thereto with a resorcinol derived bonding agent is vulcanized with a sulfur vulcanizing agent to provide a vulcanized composite having a Young's modulus of more than about 15,000 pounds per square inch, tensile strength at yield or break, whichever occurs first, in the direction of orientation at least 25 percent higher than the tensile strength of the unbonded composition, and a ratio of modulus in the direction of orientation to modulus perpendicular to the direction of orientation, which ratio is hereinafter referred to as modular anisotropy, of at least seven. The modular anisotropy of the composites of this invention may be 25 or more.

Cellulose is a carbohydrate polymer of glucose residue units and includes both regenerated and unregenerated or natural cellulose. Rayon is regenerated cellulose. Examples of natural cellulose include seed fibers represented by cotton, woody fibers represented by coniferous and deciduous woods, bast fibers represented by flax, leaf fibers represented by sisal, fruit fibers represented by coconut, but hardwood kraft, i.e., wood pulp, made by the sulfate process, is preferred. Excellent products have been obtained even from brown kraft wrapping paper, and in general unregenerated cellulose is preferred.

The aspect ratio of the cellulose strongly affects the modulus attainable. Unless designated otherwise, aspect ratio herein refers to the aspect ratio of the fiber in the rubber matrix as distinguished from the aspect ratio of the starting fiber employed in making the composites. The aspect ratio is the ratio of average length to average diameter. Examination of the modulus as a function of aspect ratio in rubber composites containing discontinuous cellulose fiber reveals that as one ascends the scale of increasing aspect ratio the modulus is increasing rapidly at an aspect ratio of 20 and continues to rise up to an aspect ratio of 200–350. An aspect ratio of 50–200 is particularly desirable. In contrast to prior teaching that 30 mm. fiber length gives the best results, which in the case of cotton represents an aspect ratio of about 1700, it was found that the disappointing results heretofore obtained with cotton are overcome and the processing difficulties minimized by using cotton of aspect ratio of 20–300. Fibers of widely different aspect ratios within the aforesaid range may be used, and for some purposes a mixture is advantageous, for example, a mixture of fibers aspect ratios 50 and 200.

The preference for hardwood fiber is probably related to its small diameter as compared to softwood fiber so that a shorter fiber can be used. The smaller diameter results in a more flexible fiber, and moreover, shorter lengths reduce further breaking on mixing into the rubber. Measurements made of the average diameters of hardwood and softwood fibers in a rubber matrix are actually widths, because the fibers are more nearly elliptical than circular in cross section. If measurements are all made in the same direction in the rubber matrix so that the shorter dimensions across the fiber are included in the average, the average width across the fiber is 10 microns for hardwood and 20 microns for softwood. The thinner fibers are advantageous, because flexibility is related to the cube of the thickness so that a fiber only ½ as thick as another would have only ⅛ of the breaking tendency. Beating the fiber increases the effective aspect ratio.

The fiber is preferably pretreated to reduce fiber to fiber interaction, which pretreatment is especially important in the case of unregenerated cellulose wood fiber. Suitable pretreatments include slurrying the fiber in water with carbon black or slurrying it in water with rubber latex. Simply stirring is sufficient at least with hardwood fiber and styrene-butadiene copolymer rubber, but it may be necessary to induce coagulation of the rubber on the fiber. The slurry may be heated to 50°–100°C., subjected to high shear, or treated with a suitable coagulant. The treated fibers are then dried and dispersed into rubber, usually by dispersing directly into massed rubber. Mixing rubber and fiber followed by other ingredients is preferred. After drying, it is advantageous to treat the fiber with a fiber plasticizer, for example, water, to inhibit breaking the fiber. However, drying at ambient temperature and humidity ordinarily leaves 5–10 percent moisture content, which amount usually exerts sufficient plasticizing action to permit incorporation without breakage beyond tolerable limits. It will be understood that weight of cellulose fiber as used herein includes ambient moisture unless the contrary is specified. Suitably treated discontinuous cellulose fiber is mixed into massed rubber by any of the mixers commonly used for compounding rubber. No special equipment or special mixing technique is required. There may be used a Brabender mixer, Banbury mixer, or the differential rolls of a rubber mill. Solution compounding in an organic solvent is applicable.

The fiber is preferably oriented in the rubber matrix. It is well known that imposing a flow gradient as by milling or extrusion orients fiber in the direction of flow. The effect is analogous to that observed when logs are discharged into a moving stream. The direction of the flow can be called the direction of processing. It is akin to the term "machine direction" used in paper making technology. Under proper conditions fibers in fiber-elastomer composites can become oriented by processing. Proper conditions include sufficiently high fiber aspect ratios, sufficiently high viscosity of uncured matrix material, and sufficient gradients of flow. The predominant direction of orientation is the direction of processing. A high degree of orientation is easily achieved by milling or extrusion. When the degree of orientation is measured by cutting a microtomed section of a rubber-cellulose fiber composite according to this invention, taking the direction of milling as 0° and measuring the angle between each fiber and the direction of milling, substantially all fall between ±20° of the direction of milling.

Tensile test specimens, cut from a single oriented, vulcanized sheet of elastomer-fiber composite exhibit differing tensile properties, depending on the angle the lengths of the specimens make with the predominant direction of orientation or processing direction. This angle herein referred to as $\beta$, may be defined as the angle formed between the predominant direction of fiber orientation and the direction in which the test specimen is pulled. Young's moduli and tensile strengths decrease as $\beta$ is increased, whereas ultimate elongations increase as $\beta$ increases. However, the highest values of Young's modulus (where $\beta$ is 0°) can vary from sheet to sheet of identically composed composites, depending on how well the fibers are oriented or how small is the average deviation of fiber axes from the flow or process direction.

Young's modulus is closely related to the average angle, $\alpha$, made between fiber axes and the test direction or the direction of the force applied during testing or use. The value of $\alpha$ is generally somewhat greater than 0° when $\beta$ is 0°. When $\beta$ is 0°, the value of a $\alpha$ characterizes the extent of orientation due to processing. If orientation is perfect, $\alpha$ is 0° when $\beta$ is 0°.

Because of the variations in the degree of orientation obtained by various means with various compositions, we have herein considered the variations in tensile properties as functions of variations in $\alpha$ rather than $\beta$. Values of $\alpha$ are the same as those of $\beta$ when $\beta$ in a test specimen is greater than $\alpha$ would be when $\beta$ is 0°. When $\beta$ is smaller than $\alpha$, $\alpha$ cannot be assumed equal to $\beta$; it can be measured by observing the angles through a microscope focussed on a microtomed section of the specimen.

Rubber cellulose composites are pictured as high modulus fibers in a weaker matrix. Reinforcement is assumed to result from the restraint exerted by the fibers upon the elongation or, in other words, the fiber carries some of the load. When a load is imposed on a composite of discontinuous fiber in a weaker matrix, it is generally agreed that the load is transferred to the fiber by shear stress in the matrix at the interphase. However, the mechanism by which the stresses are generated is unknown. At least for some composites it has been shown that the load is transmitted from the matrix to the fiber by frictional forces. Another explanation is that the matrix is bonded to the fiber and that the stresses are transmitted by the adhesion joint. Whatever the explanation, it has been found that improved short fiber composites are obtained by increasing the tenacity between the fiber surfaces and the elastomeric matrix with fiber bonding agents.

Needless to say, the integrity of the bond must persist throughout the life of the rubber article. The selection of the adhesive depends upon cost and the end use of the rubber article. For example, the adhesive for fiber-rubber composites in tires which are subject to flexing may be different than the adhesive in a seal where flexing is not encountered and the adhesive used in a water hose which must be water-insoluble may be different than in a hose carrying organic fluids.

The compositions from which the composites are prepared contain fiber bonding agents. The agents suitable for bonding discontinuous cellulose fiber to the matrix are generally those which bond cellulose cord to rubber. Bonding agents derived from resorcinol, hereinafter referred to as resorcinol bonding agents or adhesives, are widely used for bonding cord to rubber and are preferred for use with discontinuous fibers. The resorcinol adhesives comprise systems in which the fiber is treated with the adhesive and in which the adhesive is added to the rubber matrix. Either system or combinations thereof are applicable to discontinuous fibers. The addition of resorcinol and a formaldehyde donor, for example, hexamethylenetetramine, or hexamethoxymethylmelamine, to the rubber matrix constitutes a suitable bonding system. The combination known as the HRH system of hexamethylenetetramine, resorcinol and silica is particularly effective for addition to the rubber matrix. With some fibers, for example, cotton linters, pretreatment of the fiber is unnecessary if the HRH bonding system is used. The preferred ratios of components of the HRH bonding system is used. The preferred ratios of components of the HRH bonding system expressed in terms of concentration as parts by weight per hundred parts by weight of rubber is $$\frac{\text{hexamethylenetetramine} \times \text{silica}}{(\text{resorcinol})^2} = 4.$$

For treating the fibers suitable bonding systems comprise resorcinol-formaldehyde latex and butadiene-sytrene-vinyl pyridine latex.

Other adhesives which may be used on the fiber surface or compounded with the rubber include phenol-blocked polyisocyanates, epoxides, bis-ethylene urea and other phenol-aldehyde condensation products. One outstanding property of phenol-formaldehyde adhesives is excellent resistance and dimensional stability while in contact with water and most solvents. Suitable phenols besides resorcinol are hydroquinone, catechol, and pyrogallol. Suitable aldehyde type materials are formaldehyde, paraformaldehyde, acetaldehyde or formaldehyde forming materials. Resins which are suitable adhesives may be prepared by reacting an aldehyde with materials other than phenols, for example, urea, casein, or malamine. Adhesives formed by the condensation of unsaturated polyenes are also suitable, as are condensation products of alcohols and amines whether acid catalyzed or base catalyzed.

An adhesive called RFL used extensively for bonding continuous fibers to rubber is a mixture of butadiene-styrene-vinyl pyridine latex with the condensation product of resorcinol and formaldehyde in the presence of an alkali catalyst. A number of additives have been devised to enhance the adhesion of RFL systems. The additives also improve the cellulose fiber-rubber bond of the composites of this invention. The treatment of cotton cord with salts of certain metals, for example, mercury and copper, is known to bond the cord to rubber, and bonding is also observed when discontinuous cellulose fiber is similarly treated.

The metals may function as bonding ingredients by catalyzing oxidation of the rubber. More particularly, it has been found that oxidized rubber is an effective bonding agent. For example, oxidation of the coating on cellulose fiber after treatment with styrene-butadiene copolymer latex either by prolonged standing at room temperature or by heating in air or oxygen produces effective bonding ingredients, and by the presence of fiber bonding ingredients it is meant to include ingredients formed in situ.

where $E_c$ is the composite modulus, $E_r$ is the matrix modulus and $C_f$ is volume fraction of cellulose versus $\alpha$.

Figure 7:
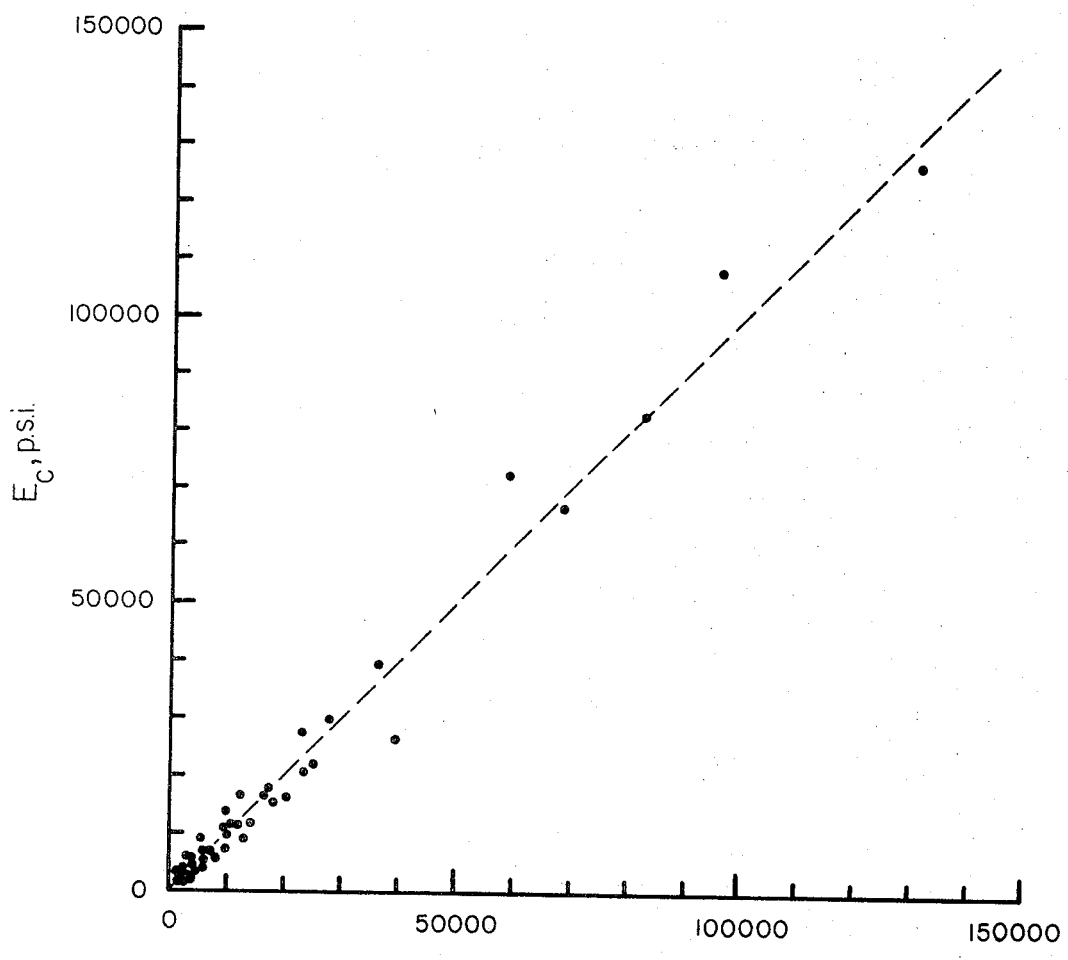

FIG. 7 is a plot derived from an empirical equation relating Young's modulus of a cellulose composite to the modulus of the matrix through the variables: aspect ratio, volume fraction and average angle of fiber orientation. Young's modulus of the composite is plotted as ordinate and the other side of the equation as abscissa.

DESCRIPTION OF PREFERRED EMBODIMENTS

There is compounded a discontinuous cellulose-rubber composite comprising:

| | Composite A Parts by Weight |
|---|---|
| Natural rubber | 75 |
| Styrene-butadiene copolymer rubber (SBR 1502) | 25 |
| Carbon black | 50 |
| Hardwood kraft cellulose fiber | 50 |
| Silica (HiSil 233) | 15 |
| Zinc oxide | 3 |
| Resorcinol | 2.5 |
| Stearic acid | 2 |
| Sulfur | 2 |
| N-(1,3-dimethylbutyl)-N'-phenyl-p-phenylenediamine | 2 |
| Hexamethylenetetramine | 1.6 |
| N-t-butyl-2-benzothiazolesulfenamide | 1.0 |

The fibers for making the above composite are pretreated to reduce fiber to fiber interactions and to reduce fiber breakage during incorporation into the rubber matrix by slurrying in water and treating with latex. To 10 parts by weight of cellulose fibers slurried in 500 parts by weight of water for three minutes at high speed in a Waring blender add 40 parts by weight of 25 percent styrene-butadiene copolymer latex (SBR 1502) and 0.4 parts by weight of water insoluble rubber antidegradant (N-(1,3-dimethylbutyl)-N'-phenyl-p-phenylenediamine) and mix 7 minutes at low speed. The rubber coagulates on the fiber during the mixing. The treated fiber, which is now coated with rubber and antidegradant is filtered, allowed to dry, and weighed. The fiber now contains 5.0 parts by weight of rubber and 0.4 parts by weight of antidegradant. It is mixed for two minutes in a Brabender mixer set at 45°C. and 50 revolutions per minute with natural rubber which has been previously broken down on a rubber mill. Carbon black, curing ingredients and fiber bonding ingredients are added and mixed for two minutes to prepare a vulcanizable composition of the aforesaid ingredients and proportions. The fiber is oriented by 20 passes through a rubber mill, the rolls of which are set at 0.07 in. (1.8 mm.) and the composite cured at 153°C. for 35 minutes in a press at 200–300 psi (pounds per square inch). The above wide mill decreases fiber breakage during orientation and results in higher modulus valcanizates as compared to a tight mill set for example at 0.015 in.

Test specimens (T–50) are cut from the cured sheet product and pulled on an Instron tensile testing machine in the direction of orientation. In the direction of orientation Young's modulus is 77,000 psi or 5662 kg/cm$^2$, and the ultimate tensile strength at break is 4500 psi (331 kg/cm$^2$). Allowing the unvulcanized composite to stand about 24 hours before curing increases the modulus of the vulcanizate as does aging the cured sheets for about the same length of time before testing. Aging in an oven 18 hours at 100°C. increases Young's modulus to 120,000 and with no loss of tensile strength. Except as indicated otherwise, other composites herein described are prepared in a similar manner.

Young's modulus E is the ratio of tensile stress (load per unit area) to tensile strain (change in length per unit length) below the proportional limit and may be expressed symbolically as $E = (P/A)(\Delta L/L_o)$ where P is the load, A is the area, L is the length of the test specimen, and $L_o$ is the original length. Young's modulus is a tensile modulus and is related to shear modulus, G, and bulk modulus, B, as follows: $E = 2G(1+\nu) = 3B(1-2\nu)$ where $\nu$ = Poisson's Ratio. The units are psi. When a material is stretched, its cross-sectional area changes as well as its length. Poisson's ratio is the constant relating these changes in dimensions, and is defined as the ratio of lateral contraction to longitudinal extension, $$\nu = \frac{\text{change in width per unit width}}{\text{change in length per unit length}}$$

Figure 1:
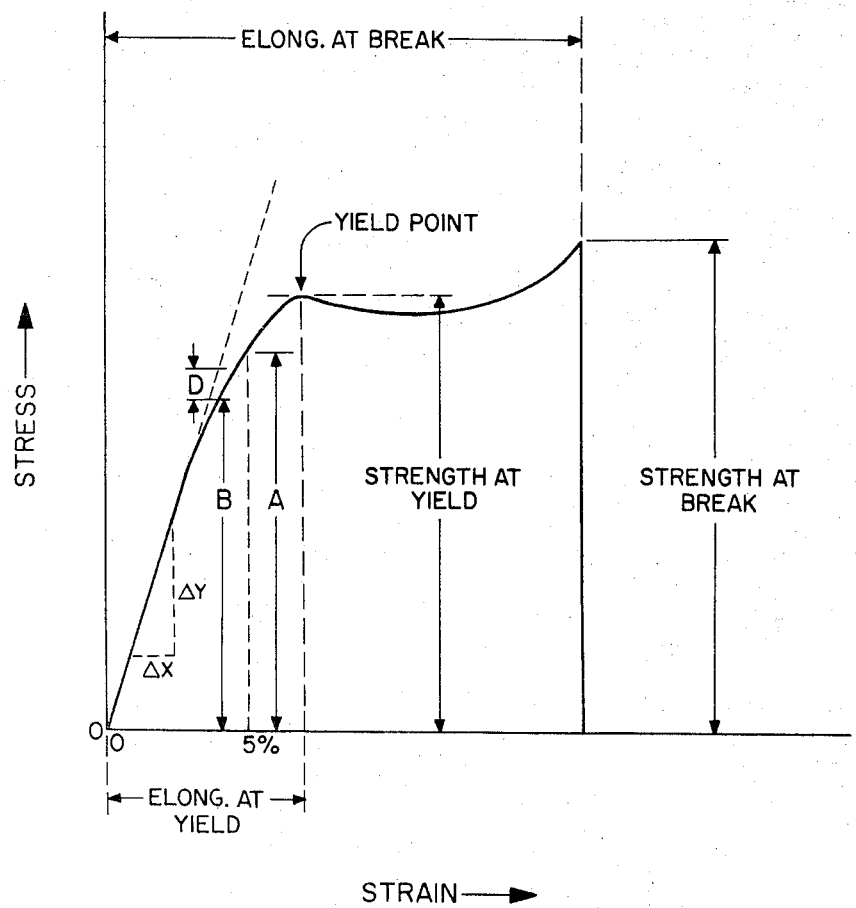
FIG. 1 is a typical stress strain curve which provides a graphic description of measured properties.

It is convenient to determine Young's modulus of composites by determining the tangent to the stress strain curve at a point of low extension on the stress strain curve where the curve is most nearly linear. The tangent will usually pass through the origin but there is sometimes a small deviation from linearity at the beginning of the curve. Young's modulus determined as the tangent may be defined as the ratio of change in stress to the corresponding change in strain at a selected optimum point on the stress-strain curve. It is the slope of the stress strain curve expressed in psi at low extension where the curve is essentially linear. Referring to FIG. 1, Young's modulus = $\Delta Y/\Delta X$. It is sometimes convenient to report tensile modulus as secant modulus $E_s$, which is the ratio of total stress to corresponding strain at any specified point on the stress-strain curve. It is reported in psi with the specified stress or strain. The 5 percent secant modulus illustrated on FIG. 1 = $A/0.05$.

The point on the stress-strain curve at which stress ceases to be proportional to strain is known as the proportional limit. The precise point at which the proportionality ceases to apply is difficult to determine, and it is more convenient to determine the point at which the stress strain deviates from a straight line by 10 percent (90 percent proportional limit). The 90 percent proportional limit illustrated in $$\text{Fig. 1} = 100 \times \frac{B}{\text{strength at break}}$$

where $D/B + D = 0.1$.

A composite similar to composite A in which the matrix rubber is wholly natural rubber except for the styrene-butadiene copolymer rubber introduced as the result of pretreating the fiber, contains 96 parts by weight of natural rubber and 4 parts by weight of styrene-butadiene copolymer rubber. The other ingredients are the same as in composite A. The fiber is oriented in the matrix as described and the oriented composite, designated composite B, vulcanized and tested. Longitudinal E of composite B is 74,500 psi, and the longitudinal strength at yield is 3,700 psi. Ultimate elongation is 7.5 percent. The corresponding transverse values are $E = 4,800$, strength = 1490, elongation = 70 percent.

The effect of different types of cellulose is illustrated by compounding styrene-butadiene copolymer rubber composites as follows:

| | Parts by Weight |
|---|---|
| Styrene-butadiene rubber | 100 |
| Carbon black | 50 |
| Cellulose fiber | 50 |
| Silica (HiSil 233) | 15 |
| Zinc oxide | 3 |
| Resorcinol | 2.5 |
| Stearic acid | 2 |
| Sulfur | 2 |
| N-(1,3-dimethylbutyl)-N'-phenyl-p-phenylenediamine | 2 |
| Hexamethylenetetramine | 1.6 |
| N-*tert*-butyl-2-benzothiazolesulfenamide | 1.0 |

The cellulose fiber is treated in the manner previously described and taking into consideration the amount of rubber thereon, the treated fiber is admixed with styrene-butadiene copolymer rubber and other ingredients to prepare composites in which the total rubber and cellulose ratio is that of the foregoing formulation. The vulcanizable compositions are milled, the fiber oriented, and the compositions cured and tested all as described previously. A composite is also prepared from glass fiber by subjecting ⅛ in. long glass fiber to similar treatment with latex and incorporating the latex coated glass into the same matrix in amount such that the composite contains an equal volume of glass as compared to the volume of cellulose in the cellulose composites. The 50 parts by weight of cellulose, specific gravity 1.5, is about 17 percent by volume of the composite. A larger proportion by weight of glass fiber is used so that the volume fraction remains 17 percent. The glass picks up only about 60 percent as much rubber as cellulose and is significantly broken up during incorporation into the rubber. The properties determined in direction of orientation of milling designated 0°, and in the transverse direction designated 90°, are summarized below:

Table I

| Fiber | Direction of Pull | E (psi) | Ultimate Elongation % | Maximum Tensile Strength (psi) |
|---|---|---|---|---|
| Brown wrapping paper | 0° | 55500 | 11 | 2500 |
|  | 90° | 3700 | 100 | 1100 |
| Whatman filter paper | 0° | 52000 | 10 | 2840 |
|  | 90° | 4300 | 125 | 1300 |
| Unbleached softwood kraft | 0° | 57000 | 13 | 2480 |
|  | 90° | 4250 | 100 | 1150 |
| Bleached softwood kraft | 0° | 51500 | 13 | 2205 |
|  | 90° | 4050 | 120 | 1130 |
| Bleached softwood sulfite | 0° | 38000 | 14 | 2400 |
|  | 90° | 3600 | 100 | 1080 |
| Bleached hardwood kraft (Lincoln) | 0° | 68000 | 9 | 2850 |
|  | 90° | 3000 | 110 | 1140 |
| Used newspaper | 0° | 38000 | 15 | 2410 |
|  | 90° | 3380 | 117 | 1250 |
| Glass fiber | 0° | 19800 | 230 | 2080 |
|  | 90° | 3300 | 280 | 1600 |
| Singapore coconut fiber | 0° | 37000 | 12 | 1910 |
|  | 90° | 3550 | 55 | 755 |
| Rayon | 0° | 54000 | 9 | 1000 |
|  | 90° | 4100 | 77 | 820 |

Measuring E in different directions shows the relationship between the predominant angle of fiber orientation and modulus. The angle, $\beta$, formed between the predominant direction of softwood fiber orientation and the direction in which the specimen is pulled is recorded in the table below together with the corresponding Young's modulus in psi $\times 10^{-3}$.

TABLE II

| $\beta°$ | $E$ psi $\times 10^{-3}$ |
|---|---|
| 0 | 52 |
| 25 | 19 |
| 43 | 8 |
| 60 | 5 |
| 85 | 4 |

The longitudinal elastic modulus is essentially directly proportional to volume fraction of cellulose over the range of about 5–35 percent by volume cellulose fiber. The effect of concentration of softwood cellulose fiber is illustrated in the following table which relates Young's modulus to concentration of softwood cellulose in percent by volume of the composition.

TABLE III

| Cellulose % by Volume | E |
|---|---|
| 0 | 2000 |
| 5 | 21500 |
| 9 | 39000 |
| 17 | 66000 |
| 23 | 77000 |

The relationship between modulus in the direction of softwood fiber orientation and mold pressure is shown in the following table where P designates pressure in psi and E again in Young's modulus in psi $\times 10^{-3}$.

TABLE IV

| P | $E$ psi $\times 10^{-3}$ |
|---|---|
| 116 | 26 |
| 205 | 31 |
| 335 | 35 |
| 480 | 44 |

When hardwood pulp is used, the pressure is not as critical. Moreover, if care is taken to dry the ingredients and green composition and to avoid ingredients which form water during cure or to remove the water before curing, high modulus composites are obtained without pressure.

The curing ingredients exert a significant effect upon the mechanical properties of the matrix and of course on the composite. The relationship between the concentration of curing ingredients in pph of rubber and Young's modulus measured in the direction of milling ($\beta = 0°$) is set forth below.

TABLE V

| Accelerator | S | $E$ ($\beta = 0°$) |
|---|---|---|
| 0.5 | 1 | 30100 |
| 1.0 | 2 | 55000 |
| 2.0 | 4 | 99500 |
| 3.0 | 6 | 121000 |
| 5.0 | 10 | 136000 |
| 4.0 | 2 | 90000 |

Once the yield point is passed, the composite is no longer elastic; it will not return to its original length after stress is removed, although the break point may not be reached until considerably higher strain. A characteristic of the high modulus composites of this invention is that the elongation at yield and elongation at break are of similar magnitude. This characteristic is a function of cellulose in contrast to certain other common fiber materials and of the fiber bonding. Bonding cellulose fiber to the rubber matrix is essential to obtain high yield strength and may more than double the modulus in some cases. The sifnificance of the bonding on modulus is demonstrated by comparing the HRH bonded system to an unbonded control. The base composition comprises:

|  | Parts by Weight |
| --- | --- |
| Styrene-butadiene rubber | 100 |
| Carbon black | 50 |
| Cellulose fiber | 50 |
| Zinc oxide | 3 |
| Stearic acid | 2 |
| Sulfur | 2 |
| N-(1,3-dimethylbutyl)-N'-phenyl-p-phenylenediamine | 2 |

To the base stock the components of the HRH system are added in varying proportions and Young's modulus determined on the vulcanizates in the direction of the fiber orientation. The results of tests on composites in which the cellulose fiber is softwood unbleached kraft together with the ingredients added to the base composition are recorded below.

The addition of hexamethylenetetramine or hexamethoxymethylmelamine and resorcinol to the matrix is sufficient to obtain high bonding, and silica may be omitted if desired. The results from formulations which contain no silica are illustrated by preparing compositions comprising:

|  | Parts by Weight | |
| --- | --- | --- |
|  | Composite | Matrix |
| Natural rubber | 87.5 | 87.5 |
| Styrene-butadiene copolymer rubber | 12.5 | 12.5 |
| Carbon black HAF | 50.0 | 50.0 |
| Lincoln hardwood kraft | 50.0 | — |
| Resorcinol | 0.5 | 0.5 |
| Hexamethoxymethylmelamine | 2.5 | 2.5 |
| Zinc oxide | 3. | 3. |
| Stearic acid | 2. | 2. |
| Sulfur | 2. | 2. |
| N-(1,3-dimethylbutyl)-N'-phenyl-p-phenylenediamine | 2. | 2. |
| N-tert-butyl-2-benzothiazolesulfenamide | 1. | 1. |

The compositions are cured in a press for 20 minutes at 153°C. The longitudinal E of the composite is 63,500 psi and that of the matrix only 1250 psi. After aging 65 hours at 100° in an air oven, the modulus increases to 93000 psi and 7890 psi, respectively. The longitudinal strength of the composite increases about 10 percent after aging, whereas the strength of the matrix decreases more than 10 percent after aging.

As an example of forming bonding ingredients in situ cellulose fiber containing 30 percent by weight styrene-butadiene copolymer rubber prepared from latex in the manner described, except that no antidegradant is added to the fiber, is heated in an oven for 20 minutes at 145°C. A composite is prepared having the composition of composite A except that the resorcinol and the

TABLE VI

| Stock | A | B | C | D | E | F |
| --- | --- | --- | --- | --- | --- | --- |
| Hexamethylenetetramine | 0.80 | 0.80 | 3.20 | 3.20 | 2.50 | — |
| Resorcinol | 1.25 | 5.0 | 5.0 | 5.0 | 2.50 | — |
| Silica (HiSil 233) | 7.5 | 7.5 | 7.5 | 30.0 | 15.0 | 15.0 |
| E × 10$^{-3}$ | 51. | 52. | 60. | 66. | 67. | 34. |

The significance of bonding on yield strength is illustrated by the low yield strength of unbonded composite stock F above, which is 1340–1360 pounds per square inch in the direction of orientation as compared to 1750 and above for identical composites except bonded with HRH or Gentac (butadiene-styrene-vinyl pyridine latex) or RFL. The bonding agent known as RFL is prepared by mixing 11 parts of resorcinol, 280 parts of water, 16.5 parts of 37 percent aqueous formaldehyde, 30 parts of 5 percent aqueous sodium hydroxide, 190 parts of a 40 percent solids polyvinylpyridine-styrene-butadiene latex. The emulsion is allowed to stand a day before use.

Even greater improvement is observed when the softwood cellulose is replaced by hardwood kraft and the bonded and unbonded systems compared.

TABLE VII

| Bonding Agent | Tensile at Yield psi |
| --- | --- |
| None | 1240 |
| Hexamethoxymethyl-melamine-resorcinol | 2700 |
| HRH | 2600 |

Glue-glycerine has sometimes been used to treat cellulose intended for use as a rubber filler but has an adverse effect on the bonding and should be avoided.

hexamethylenetetramine are omitted. The antidegradant is added to the matrix. An identical composite is prepared except that the heating for 20 minutes at 145°C. is omitted. The composites are vulcanized by heating 35 minutes at 153°C. in a press. The composite prepared from treated fibers subjected to the heating step has an elongation at break of 21 percent as compared to 225 percent for the composite prepared without the heating step, and longitudinal tensile strength at yield about 57 percent greater and E about 40 percent greater than the unheated control. When the coated fibers are aged 7–8 days at room temperature and incorporated into the matrix with the resorcinol and hexamethylenetetramine, a longitudinal tensile at yield of 3140 psi is obtained as compared to the aforesaid 1240 psi unbonded. Also, the transverse tensile strength at yield is improved compared to HRH alone.

Bonding ingredients formed by the oxidation of the styrene-butadiene rubber coating contains more carbonyl and hydroxy groups than the unoxidized rubber. A solvent extract of the oxidized rubber is a bonding agent even for non-cellulosic fibers and filaments. Continuous filaments coated with the extract and embedded in rubber gives adhesion values about 100 percent greater than corresponding untreated filaments.

If the fibers are dried in an oven, it is desirable to add fiber plasticizer to inhibit breakage on milling and thereby increase the modulus. Either water or glycerine are satisfactory plasticizers. The modulus of vulcanizates obtained from plasticized softwood fiber as compared to composite prepared from the same fiber dried in an oven at 90°C. to constant weight is illustrated in the table below. Water in the amount indicated is added to the dry fiber.

TABLE VIII

| Stock | I | II | III |
|---|---|---|---|
| $H_2O$ | — | 5 | 17 |
| Young's modulus (0°), psi | 24500 | 48000 | 73000 |
| Young's modulus (90°), psi | 3100 | 8700 | 4900 |
| Tensile strength | 2200 | 2400 | 2500 |
| Ultimate elongation, % | 18 | 10 | 9 |

With more than 5 percent water, the composition should be allowed to stand 1–2 days before curing. Addition of 5 percent glycerine to fiber dried to constant weight gives similar results to those obtained by the addition of 5 percent water. Similar results are obtained with hardwood fiber.

Cellulose fiber is unique in its ability to provide high modulus composites as compared to most common fiber materials. The uniqueness is demonstrated by comparing the properties of various vulcanized composites described in Table I with those of non-cellulose composites. Various fibers are coated with styrene-butadiene copolymer rubber from latex in the manner previously described, and after allowing to dry, the coated fibers are mixed with more rubber and other ingredients to form vulcanizable composites. The composites contain the styrene-butadiene copolymer matrix previously described, the composition of which is:

|  | Parts by Weight |
|---|---|
| Styrene-butadiene rubber | 100 |
| Carbon black | 50 |
| Silica (HiSil 233) | 15 |
| Zinc oxide | 3 |
| Resorcinol | 2.5 |
| Stearic acid | 2 |
| Sulfur | 2 |
| N-(1,3-dimethylbutyl)-N'-phenyl-p-phenylenediamine | 2 |
| Hexamethylenetetramine | 1.6 |
| N-tert-butyl-2-benzothiazolesulfenamide | 1.0 |

The matrix contains dispersed therein fiber in the amount of 17 percent by volume so that the composite comprises matrix 83 percent and fiber 17 percent. The aspect ratio of the fibers varies, largely due to a tendency for some of them to break up during processing more than others. The composites are cured in a press by heating at 153°C. for 35 minutes and tested. The measured properties are defined in FIG. 1 and the results summarized in the table following. For the convenience of avoiding the difficultly determinable point of deviation from a straight line, the 90 percent proportional limit is determined as explained above and is expressed as percent of yield strength or break strength, whichever is higher.

A similar composite containing cotton of the aforesaid aspect ratio but unbonded gives a yield strength of 1,295 psi, ultimate elongation at break of 58.5 percent and longitudinal Young's modulus of 39,850 psi.

TABLE IX

|  | Aspect ratio, l./d. | Young's modulus $E^0$ | Young's modulus $E^{90}$ | Modular anisotropy $E^0/E^{90}$ | 5% secant modulus in 0° direction | Elongation percent at — Yield 0° | Elongation percent at — Break 0° | Elongation percent at — Break 90° | Strength at — Yield 0° | Strength at — Break 0° | Strength at — Break 90° | Proportional limit (90%), percent of strength |
|---|---|---|---|---|---|---|---|---|---|---|---|---|
| Brown wrapping paper | 176 | 55,000 | 3,700 | 15.0 | 43,500 | 9.5 | 11 | 100 | 2,500 | 2,350 | 1,100 | 60 |
| Whatman filter paper | 120 | 52,000 | 4,300 | 10.8 | 43,000 | 9.5 | 10 | 125 | 2,840 | 2,600 | 1,300 | 80 |
| Unbleached softwood Kraft | 55 | 57,000 | 4,250 | 13.5 | 40,000 | 9 | 13 | 100 | 2,480 | 2,450 | 1,150 | 55 |
| Bleached softwood Kraft | 45 | 51,500 | 4,050 | 12.7 | 37,200 | 10 | 13 | 120 | 2,205 | 2,100 | 1,130 | 60 |
| Bleached softwood sulfite | 45 | 38,000 | 3,600 | 14.2 | 32,700 | 10.5 | 14 | 100 | 2,400 | 2,300 | 1,080 | 65 |
| Bleached hardwood Kraft | 120 | 68,000 | 3,000 | 22.6 | 52,000 | 6.5 | 11 | 110 | 2,850 | 2,750 | 1,140 | 75 |
| Used newspaper | 35 | 38,000 | 3,400 | 11.2 | 33,500 | 14 | 15 | 117 | 2,410 | 2,400 | 1,250 | 75 |
| Cotton | 146 | 52,300 | 3,120 | 16.7 | 42,200 | 7 | 9 | 110 | 2,360 | 2,200 | 1,150 | 75 |
| Rayon | 250 | 54,000 | 4,100 | 13.1 | 38,800 | 7 | 9 | 77 | 2,000 | 1,680 | 820 | 65 |
| Nylon 66 | 200 | 37,700 | 3,350 | 11.1 | 24,500 | 17 | 23 | 180 | 3,200 | 2,000 | 500 | 30 |
| Do | 136 | 29,400 | 4,300 | 6.9 | 20,600 | 19 | 27 | 225 | 2,695 | 1,780 | 1,252 | 25 |
| Polyester | 200 | 39,200 | 3,500 | 11.1 | 24,400 | 7.5 | 272 | 317 | 1,345 | 1,750 | 1,216 | 55 |
| Polypropylene | 62 | 14,500 | 3,100 | 4.7 | 9,600 | — | 182 | 195 | 875 | 1,832 | 935 | 15 |
| Orlon acrylic | 69 | 34,200 | 5,150 | 6.7 | 23,500 | 14.5 | 142 | 230 | 1,790 | 1,520 | 935 | 50 |
| Wool | 88 | 22,200 | 3,700 | 6.0 | 12,000 | 9 | 135 | 270 | 1,140 | 1,845 | 1,129 | 65 |

Figure 2:
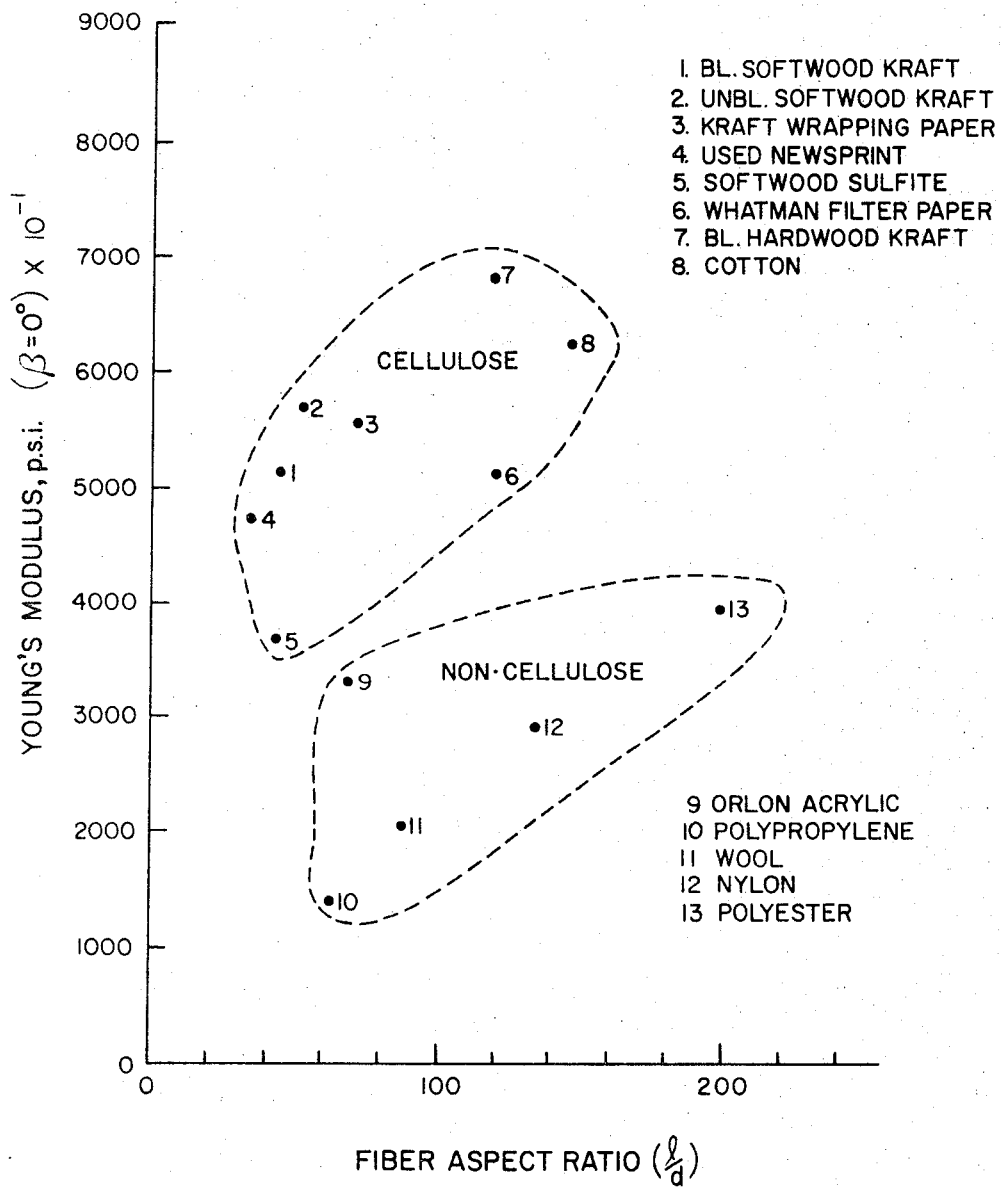
FIG. 2 is a plot of Young's modulus vs. fiber aspect ratio of cellulose and non-cellulose materials.

The unique properties of bonded cellulose rubber composites is graphically illustrated by FIG. 2 which relates Young's modulus to fiber aspect ratio of cellulosic and non-cellulosic fiber. It will be noted that in general the Young's modulus of non-cellulose composites is simply a function of aspect ratio whereas the cellulose composites show a higher order of magnitude of modulus values in random array.

EFFECT OF PRETREATMENT OF CELLULOSE FIBERS

The usual agents known for reducing fiber to fiber interaction are applicable for pretreating cellulose fiber and others have been found. The function of the pretreating adjuvants is to reduce the force of attraction between the fibers below that between the fibers and the matrix. Some pretreating agents interfere with some bonding agents, but a few simple experiments will suffice to arrive at an overall satisfactory system. Effective pretreating agents are softeners, plasticizers, extender oils, tackifiers, carbon blacks, silicas, waxes, paper sizes, ketene dimer, soft latices and water insoluble organic amines. Suitable amines are N,N'-di-heptyl-p-phenylenediamine, N,N'-dioctyl-p-phenylenediamine, polymeric 2,2,4-trimethyl-1,2-dihydroquinoline, and 6-ethoxy-1,2-dihydro-2,2,4-trimethylquinoline. By softeners, plasticizers, and tackifiers for pretreatment are meant processing materials for elastomers. The pretreating agents will be recognized as including materials and compounding ingredients for elastomers, and it is advantageous to select material normally used in elastomer compounding. The pretreating step may be regarded as predispersing.

The pretreatment of discontinuous cellulose fibers greatly improves their dispersion in the rubber as shown by the number of non-dispersed particles visible upon examining a cross section of the composite. This improved dispersion results in a higher longitudinal Young's modulus, a better orientation as shown by higher modular anisotropy and a higher transverse elongation. The relationship between pretreatment agents on softwood kraft fiber and non-dispersed particles per square inch designated NDP is shown in the table.

Table X

| Cellulose | Pre-Treatment | NDP Number/in² | E (0°) | Modular Anisotropy | Ult. El. % (90°) |
| --- | --- | --- | --- | --- | --- |
| Softwood kraft | None | 398 | 16000 | 4.0 | 42 |
| Softwood kraft | Gentac | 138 | 50500 | 10.5 | 132 |
| Softwood kraft | RFL | 46 | 30100 | 8.5 | 140 |
| Softwood kraft | SBR latex | 4 | 42500 | 10.5 | 128 |

The combined effects of fiber pretreatment and fiber bonding may increase the strength of the composite 300–400 percent. The separate and combined effects are illustrated by preparing a base composition comprising:

| | Parts by Weight |
| --- | --- |
| Styrene-butadiene copolymer rubber | 100 |
| Cellulose fiber | 50 |
| Carbon black (HAF) | 50 |
| Silica | 15 |
| Zinc oxide | 3 |
| Stearic acid | 2 |
| Sulfur | 2 |
| N-(1,3-dimethylbutyl)-N'-phenyl-p-phenylenediamine | 2 |
| N-tert-butyl-2-benzothiazolesulfenamide | 1 |

The cellulose fiber is pulped and dried wrapping paper. In one case it is simply added to the matrix without pretreatment or bonding agent. Another portion of the same fiber is predispersed in SBR latex and the predispersed fiber added to the matrix without bonding agent. The same predispersed fiber is also used with the HRH bonding system, i.e., resorcinol and hexamethylenetetramine is added to the matrix. In other experiments the fiber is subjected to combined predispersing and bonding ingredients. The strengths of the resulting vulcanizates at yield follow:

| | Strength at Yield psi |
| --- | --- |
| Without predispersion or bonding | 595 |
| Predispersed in SBR latex — no bonding | 1325 |
| Predispersed in SBR latex and used with HRH | 2270 |
| Without predispersion but used with HRH | 1180 |
| Predispersed and bonded with Gentac | 1870 |
| Predispersed and bonded with RFL | 1750 |

Figure 3:
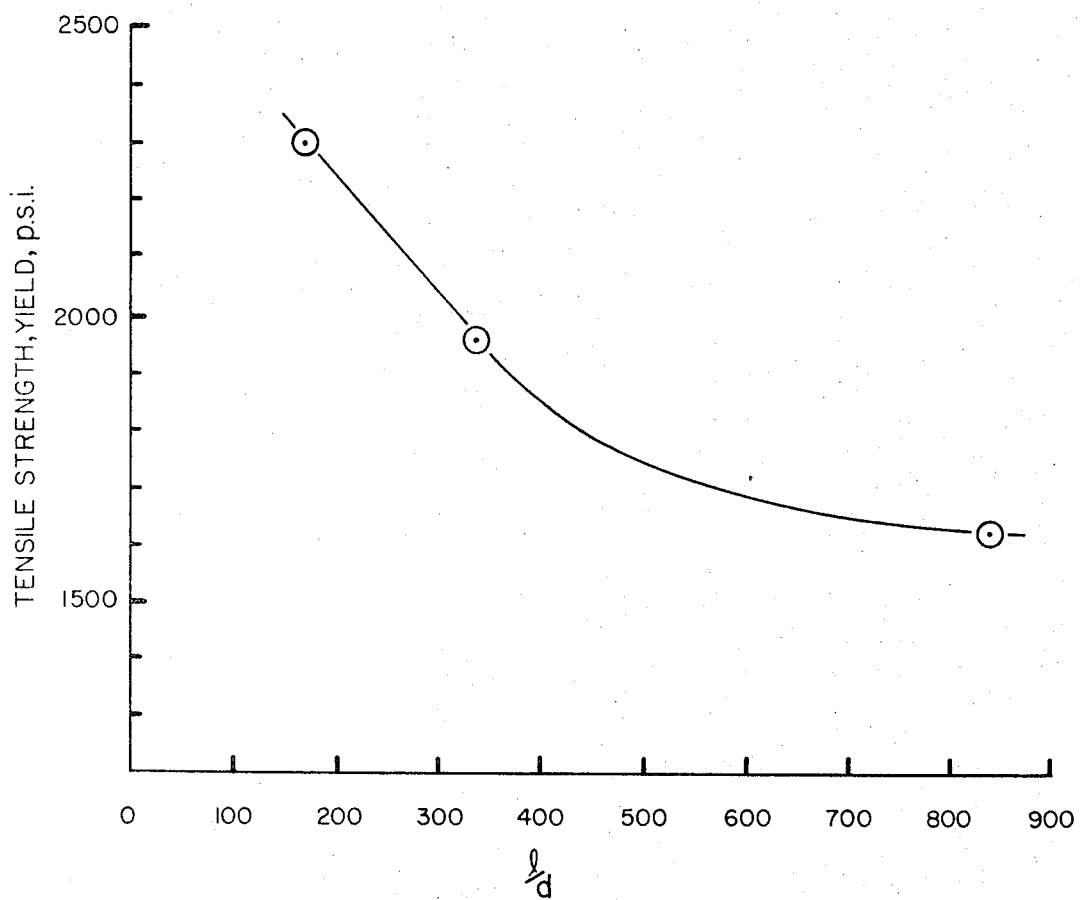
FIG. 3 is a graph showing the relationship between tensile strength at yield of cotton reinforced composites and aspect ratio.

Cotton fiber with an aspect ratio greater than about 350 disperses so miserably that the strength of the composite prepared therefrom is seriously impaired. Also, the longer fibers have an adverse effect on the orientation. The results are illustrated by FIG. 3 where tensile strength at yield is plotted against aspect ratio. The composition is the same butadiene-styrene rubber composition illustrated in connection with Table I and is prepared in the same manner and vulcanized in a press by heating 35 minutes at 153°C. The startling increase in strength as the aspect ratio drops below 350 is evident.

The Young's modulus of discontinuous cellulose composites, $E_c$, is related to the modulus of the rubber matrix, $E_r$, fiber aspect ratio, $l/d$, fiber volume fraction, $C_f$, and the average angle ($\alpha$) between the fibers and the direction of force by the equation $E_c = E_r [1 + 0.25\ C_f (0.85\ l/d + 26) (1/0.01 + \sin \alpha - 0.75)]$.

The foregoing empirical equation fits the measured properties very well as illustrated by FIG. 7 where $E_c$ is plotted against the right hand side of the equation. The measured quantities are obtained from composites in which hardwood kraft, sulfur, and accelerator concentration are variable, the other ingredients comprising:

| | Parts by Weight |
| --- | --- |
| Styrene-butadiene copolymer rubber | 20 |
| Natural rubber | 80 |
| Carbon black (FEF) | 25 |
| Silica (HiSil 233) | 15 |
| Zinc oxide | 3 |
| Stearic acid | 2 |
| Hexamethylenetetramine | 1.6 |
| Resorcinol | 2.5 |
| N-(1,3-dimethylbutyl)-N'-phenyl-p-phenylenediamine | 4 |

The accelerator is N-tert-butyl-2-benzothiazolesulfenamide. The cellulose fibers are slurried in water with SBR latex and antidegradant in the manner described. The treated fiber and antidegradant are allowed to dry and are then dispersed and oriented in the matrix as described for composite A. Three volume fractions of hardwood cellulose are used, namely, $C_f = 0.11$, 0.20 and 0.33. The preparation of composites in which $C_f$ is 0.33 cellulose introduces four parts by weight of antidegradant through the fiber treatment and the total antidegradant in all the compositions is adjusted to four parts by weight antidegradant. For each volume fraction, three curing systems are used as follows:

| Accelerator | 0.5 | 1.0 | 2.0 |
|---|---|---|---|
| Sulfur | 1.0 | 2.0 | 4.0 |

For each volume fraction and curing system there is used cellulose of average aspect ratio 4.5, 49 and 170, respectively. There is also used with the middle volume fraction and middle curing system cellulose fiber of aspect ratio of 17. All of the compositions are cured in a press by heating 25 minutes at 153°C. The Young's modulus of the composites is determined in four directions, namely, the direction of predominate orientation or zero test angle, 20°, 45°, and 90°. On five specimens tested at zero test angle from the block of 27 specimens containing the cellulose of the highest aspect ratio the average angle between the fibers and the direction of force is determined experimentally by measuring the angle $\alpha_i$ between each fiber of a microtomed section and the direction of force.

Figure 4:
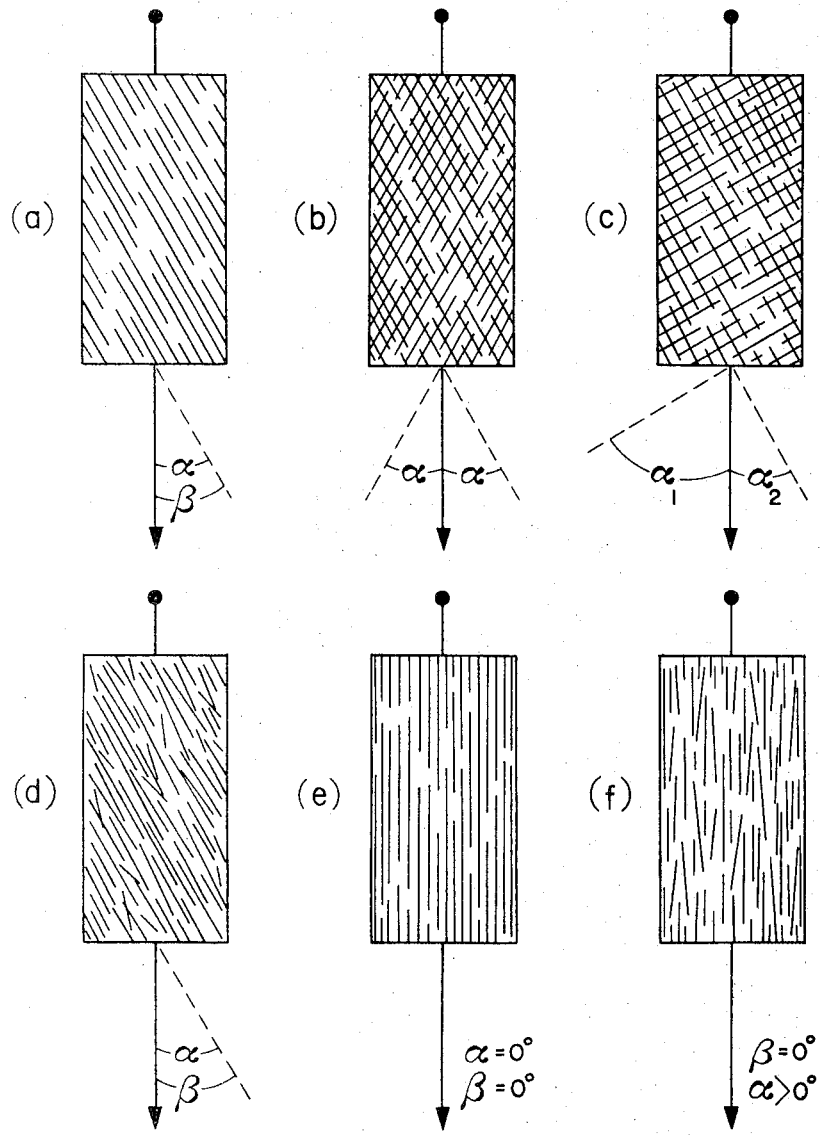
FIG. 4 represents some possible types of fiber orientations designated $a, b, c, d, e,$ and $f$.
Figure 5:
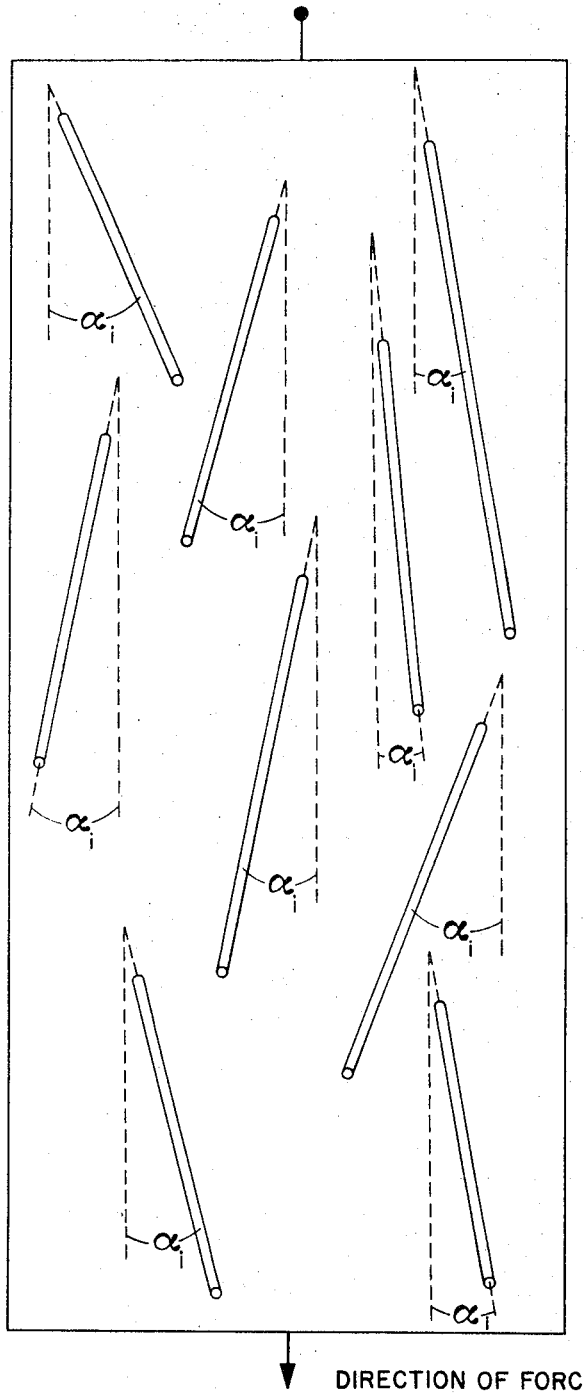
FIG. 5 is a schematic representation of an enlarged microtomed section of an oriented composite.

Some of the possible orientations in specimens of discontinuous cellulose composites are illustrated schematically by FIG. 4. The possibilities represent composites in two dimensions, wherein the XY plane is in view. Similar views could be obtained in the YZ and xz planes. (a) represents an ideally oriented specimen which was cut at an angle $\beta$ in respect to the process direction. Here, since orientation is perfect, $\alpha$ and $\beta$ are equal. (b) represents a two-ply composite wherein orientation is ideal in each ply; however, the two plies were rotated away from the test direction equally, but in opposite directions. The angles made by fibers in each ply are equal to the angles made by fibers of the other ply in respect to the test or use direction. In this case, the tensile properties are similar to those obtained in the case wherein all of the fibers are oriented in the same direction as in (a). In each ply, $\alpha$ is considered positive. The effect is the sum of the effects of the two plies. In reality, the modulus of such a composite could be somewhat higher than the average of the two plies, due to shear coupling between the two plies and a tendency for the two plies to rotate in opposite directions during stretching. (c) represents a case similar to that of (b); however, the directions of the two plies are not rotated to the same extent. In this case, $\alpha$ is $(f_1\alpha_1 + f_2\alpha_2)/(f_1\ f_2)$ where $f_1$ and $f_2$ are the relative amounts of fibers in the plies rotated to the extents of $\alpha_1$ and $\alpha_2$, respectively. (d) represents a more realistic case of (a); the fibers are not ideally oriented; however, the orientation is to a sufficient extent that $\alpha$ can be equated to $\beta$. The angle $\beta$ is greater than $\alpha$ would be, were the specimen rotated such that $\beta$ would be 0°. (e) represents the ideal case where $\alpha$ and $\beta$ are both 0°. In such a case maximum strength and modulus for the composition would be obtained; in practice, however, the case illustrated by (f) is more likely to be obtained.

In order to measure $\alpha$ for the case illustrated by (f), the angles made by each fiber with the direction of force can be measured by microscopic observation of microtomed sections. The angles measured are further illustrated by FIG. V which is a schematic representation of an enlarged microtomed section. Here $\alpha$ is the average of all of the individual angles $\alpha_i$, which are all considered positive. Such a method is generally applicable to the measurement of $\alpha$.

Figure 6:
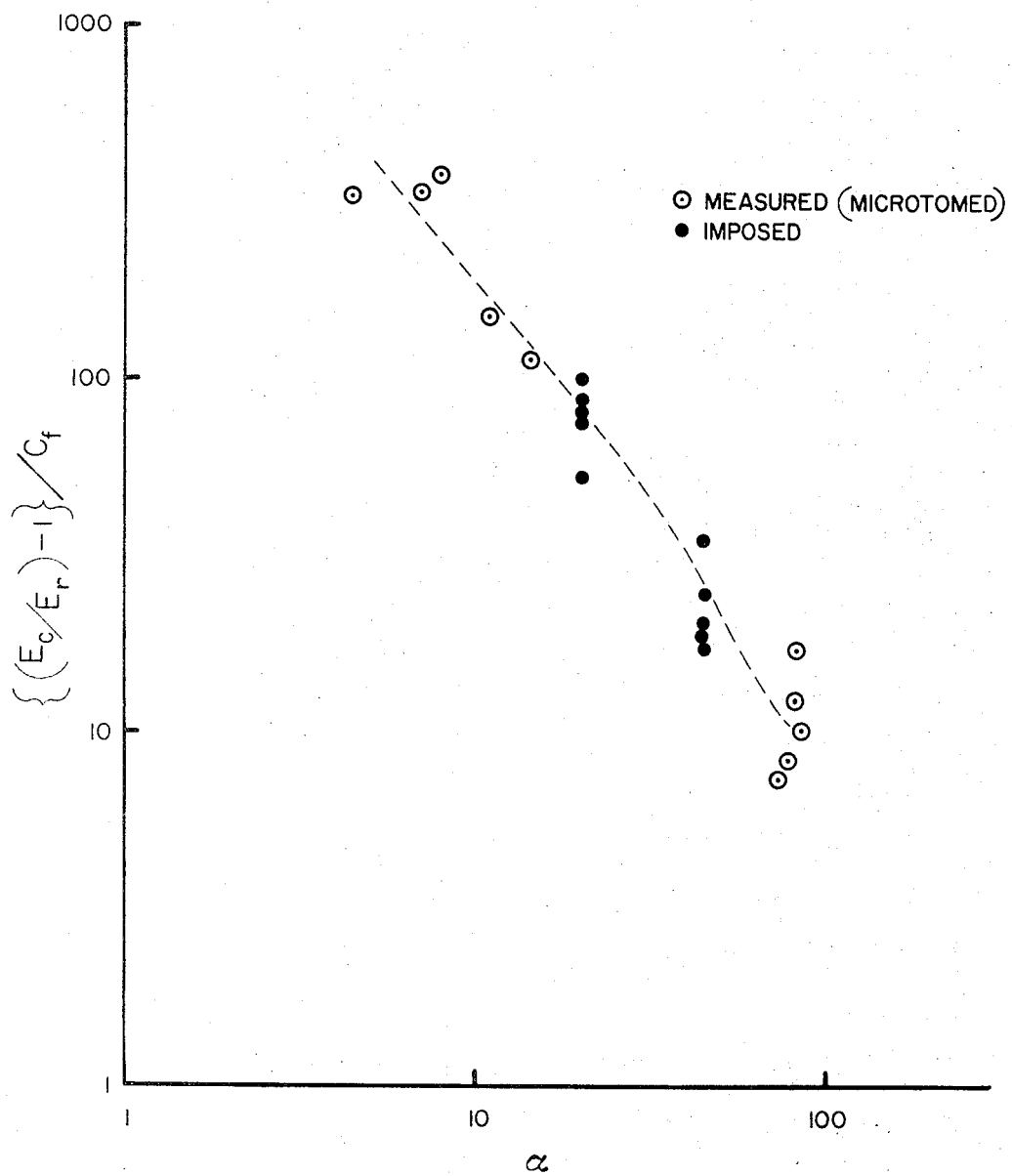
FIG. 6 is a logarithmic plot of the expression $$\frac{\frac{E_c}{E_r}-1}{C_f}$$

If $\alpha_o$ is the value of $\alpha$ when $\beta$ is 0, then as $\beta$ changes within the range of $\alpha_o$, Young's modulus is not significantly different because, although a change of test direction within the limits of $\alpha_o$ changes the angles, $\alpha_i$, of the fibers oriented in one direction, the effect is cancelled by a corresponding change with respect to the angles of the fibers oriented in the other direction. A similar effect occurs when $\beta$ is larger than $90-\alpha_o$. If $\beta$ is between $\alpha_o$ and $90-\alpha_o$, then $\beta$ and $\alpha$ become the same. Experimentally determined values of $\alpha$ are 15.5°, 11°, 7°, 4.5°, 8° and the complements thereof. On logarithmic paper $\alpha$ is plotted against $$\frac{\frac{E_c}{E_r}-1}{C_t}$$

and the values for $\alpha = 20$ and 45 added to the plot as imposed values of $\alpha$. From the curve, FIG. 6, it is deduced that it is a function of $1/\sin \alpha - 0.75$. A small constant, 0.01, is added to sin $\alpha$ to prevent the denominator going to zero. The modulus of a composite in which the fiber is randomly oriented is about ⅔ of the modulus in the predominant direction of orientation of a similar composite in which the fiber is directionally oriented.

In the high modulus composites of the present invention $E_c$ is about 10 or more times $E_r$. Thus, the quantity $C_f (0.85\ l/d + 26) (1/0.01 + \sin \alpha - 0.75)$ equals 36 or higher. It will be appreciated that similar but not identical equations can be derived from other fibers and other matrices.

The precise modulus and strength of cellulose composites will vary depending upon the presence or absence of reinforcing carbon black and type thereof. The results obtained with a gum matrix except for the silica bonding ingredient are illustrated by preparing a composite comprising:

| | Parts by Weight |
|---|---|
| Styrene-butadiene copolymer rubber (SBR 1502) | 100 |
| Softwood kraft | 100 |
| Silica | 15 |
| Resorcinol | 2.5 |
| Hexamethylenetetramine | 1.6 |
| Zinc oxide | 3 |
| Stearic acid | 2 |
| Sulfur | 2 |
| N-(1,3-dimethylbutyl)-N'-phenyl-p-phenylenediamine | 2 |
| N-tert-butyl-2-benzothiazolesulfenamide | 1 |

The fibers are pretreated with SBR latex and the antidegradant in the manner described, the treated fiber allowed to dry, incorporated into the matrix oriented therein and the resulting composite cured by heating for 45 minutes at 153°C. The longitudinal E is 46,000 psi and the longitudinal strength is 1830 psi.

In composites containing carbon black the type of black exerts a significant influence on the properties. The influence of type of carbon black is illustrated by preparing composites comprising:

|  | Parts by Weight |
|---|---|
| Natural rubber | 81.5 |
| Styrene-butadiene copolymer rubber | 18.5 |
| Hardwood kraft | 50 |
| Carbon black | 50 |
| Silica | 15 |
| Resorcinol | 2.5 |
| Hexamethylenetetramine | 1.6 |
| Zinc oxide | 3 |
| Stearic acid | 2 |
| Sulfur | 2 |
| N-(1,3-dimethylbutyl)-N'-phenyl-p-phenylenediamine | 2 |
| N-tert-butyl-2-benzothiazolesulfenamide | 1 |

The fibers are pretreated with SBR latex and the antidegradant in the manner described, the treated fibers allowed to dry, incorporated into the matrix, oriented therein and the resulting composites cured by heating for 20 minutes at 153°C. The longitudinal strength and modulus of the vulcanized product is shown in the table.

| Carbon Black | Longitudinal Strength psi | Longitudinal Modulus psi |
|---|---|---|
| Fine thermal | 2450 | 29500 |
| HAF — low structure | 2495 | 34700 |
| ISAF | 2875 | 43500 |
| Medium thermal | 3270 | 54700 |
| Semi reinforcing furnace | 3140 | 58000 |
| High abrasion furnace | 3195 | 58500 |
| Super abrasion furnace | 3180 | 65900 |
| Easy processing channel | 3315 | 71500 |
| Fast extruding furnace | 3720 | 80800 |

Elastomer is used in the usual sense to mean substances which possess the property of forcibly retracting to approximately their original size and shape after being greatly distorted, which distortion should be at least 100 percent. Natural rubber has the two outstanding characteristics of unusual elasticity and vulcanizability. Synthetic rubber-like polymers possess these characteristics in varying degree, although the preferred elastomers are diene rubbers, which class includes natural rubber in its various forms. Others are the butadiene rubbers, which comprise cis-polybutadiene and other polybutadienes, styrene-butadiene copolymer rubbers, chloroprene rubbers, which are polymers of 2-chlorobutadiene-1,3; ethylene propylene diene monomer rubber (EPDM), which is a terpolymer of ethylene, propylene and a nonconjugated diene, butyl rubbers, which are copolymers of isobutylene and a small amount of a conjugated diene, isoprene rubbers, which comprise the various polyisoprene elastomers and nitrile rubbers, which are elastomers made essentially from butadiene and acrylonitrile.

Specialty elastomers which may be used in the practice of the invention are ethylene-propylene copolymer rubber (EP), chlorosulfonated polyethylene, fluorocarbon rubbers, polysulfide rubbers, silicone rubber, urethane rubbers, and acrylic rubbers which are acrylic ester polymers, for example, ethyl acrylate base elastomers.

The compositions are vulcanizable and vulcanization is used in the general sense to mean any process which increases the elastic properties of an elastomer and reduces the plastic properties. Elemental sulfur, organic vulcanizing agents which contain sulfur, organic peroxide vulcanizing agents and metal oxide vulcanizing agents are well known and applicable to practice of this invention. Temperature change alone affects vulcanization of some elastomers.

The effect of different elastomers is illustrated by pretreating hardwood fiber with styrene-butadiene copolymer latex in the manner described and incorporating the treated fiber into a rubber matrix. The ultimate composition of the composites comprises:

|  | Composite | | |
|---|---|---|---|
|  | C | D | E |
| EPDM Rubber (Nordel 1470) | 90 | — | — |
| 2-Chlorobutadiene rubber (Neoprene W) | — | 90 | — |
| Butadiene acrylonitrile (medium-Hycar 1053) | — | — | 90 |
| Styrene-butadiene copolymer rubber (SBR 1502) | 10 | 10 | 10 |
| Carbon black | 50 | 50 | 50 |
| Extender oil | 20 | 0 | 5 |
| Cellulose fiber (hardwood kraft) | 50 | 50 | 50 |
| Silica | 15 | 15 | 15 |
| Zinc oxide | 5 | 5 | 5 |
| Resorcinol | 2.5 | 2.5 | 2.5 |
| Stearic acid | 1 | 0.5 | 1 |
| Sulfur | 1.5 | — | 0.5 |
| N-(1,3-dimethylbutyl)-N'-phenyl-p-phenylenediamine | 2.0 | — | — |
| Hexamethylenetetramine | 1.6 | 1.6 | 1.6 |
| Mercaptobenzothiazole | 0.5 | — | — |
| Tetramethylthiuram monosulfide | 1.5 | — | — |
| Magnesium oxide | — | 4. | — |
| 2-Mercaptoimidazoline | — | 0.5 | — |
| Dioctylphthalate | — | — | 5.0 |
| Tetramethylthiuram disulfide | — | — | 1.0 |
| 2,2'-Dithiobisbenzothiazole | — | — | 2.0 |

Composites C and E contain SAF black and composite D contains EPC black. The composites are cured at 153°C. in a press for 35 minutes in the case of composites C and E and 10 minutes in the case of composite D. The matrix alone is compounded as a control by omitting the fiber so that the compositions are identical except for the presence or absence of cellulose. Also a composite similar to composite E is prepared except that the bonding ingredients are omitted. The longitudinal strength and modulus of the composite and corresponding matrix are shown below as is the effect of bonding composite E.

|  | Longitudinal Strength psi | Longitudinal Modulus psi |
|---|---|---|
| Composite C | 1940 | 46600 |
| Matrix of Composite C | 2120 | 1250 |
| Composite D | 2430 | 51500 |
| Matrix of Composite D | 2170 | 2940 |
| Composite E | 2050 | 44900 |
| Matrix of Composite E | 2350 | 1740 |
| Composite E without bonding | 480 | 15000 |

Wherever rubber reinforced with continuous fiber is used the composites of the present invention may often replace it. Such uses include the manufacture of belts, tires, hose, and the like. The discontinuous cellulose composites may advantageously comprise the belt of the currently popular belted pneumatic tires, or they may be used throughout the construction of a pneumatic tire including the carcass, sidewalls and chafer strip. They find application in solid industrial tires, off the road tire treads, roofing, flashing and pond lining. It will be appreciated that two or more plies of the new composites may be combined to achieve different degrees of strength and stiffness. Building two plies of similar directionally oriented composites of similar thicknesses at right angles to the direction of orientation provides an assembly in which the high modulus in the direction of orientation of one ply is substantially the same as right angles thereto. Conveyer belts are an important application for which purpose EPDM reinforced with discontinuous cellulose is admirably suited. Neoprene composites are useful materials of construction for solvent resistant hose. Composites reinforced with short cellulose fiber may be a component of many reinforced rubber products which incorporate a fiber reinforced composite.

Continuous cord has been embedded in rubber reinforced with short fiber to increase modulus and strength, and the cellulose composites described herein may be similarly treated. It has been observed that embedding brass plated wire cord in oriented cellulose composites in the direction of orientation increases adhesion about 75 percent as compared to adhesion in the transverse direction.

For preparing strong, stiff, short fiber elastomeric composite structures, the principles herein described are advantageous with any of the organic fibers used for reinforcing rubber. The more desirable organic fibers are those having a Young's modulus of greater than 300,000 psi, a strength greater than 30,000 psi, an aspect ratio of 50–350 and an average cross-sectional dimension of less than 40 microns. The ratio of average length to average cross-sectional dimension is desirably within the range previously described, for example 50 to 350. The original fiber length is largely retained after mixing by using an internal mixer operated at a low or moderate rate of shear to mix the fiber and elastomer. For a fast, economical, versatile process which permits conventional mixing cycles of 3–10 minutes, use of an internal mixer is indispensable. Placement of the fiber in the material is accomplished by the imposition of a flow gradient at a sufficiently low rate of shear to permit the fiber to survive in essentially unbroken condition. For preparing a sheet of the composite, it is desirable to reduce the thickness of the mass slowly. In general, the thickness after each pass through rollers of a rubber mill should not reduce the original thickness by more than one-half.

Another way to achieve high modulus and strength besides well-orienting the fiber is well-randomizing the fiber. This may be accomplished by repeated passes of the composite through a mill in different directions or by passing the composite through a rubber mill in a direction perpendicular to direction of orientation. Surprisingly, from one-half to three-fourths the modulus and strength of unidirectional composites are obtained from well-randomized composites whereas the theoretical value is only three-eighths.

Treating fiber to reduce fiber to fiber interaction, for example by mixing a slurry of the fiber with a latex or suspension of a particulate solid, is to be contrasted with various treatments which have the opposite effect and tend to stick the individual fibers together. Treatment to reduce fiber to fiber interaction excludes, of course, steps of agglomerating the fiber, for example, by exerting pressure on elastomer coated fibers sufficient to bond them together. Thus, there is produced particulate organic fiber of reduced fiber to fiber interaction. Bonding agents may be added to the fibers as previously described providing they do not significantly interfere or nullify the treatment to reduce fiber to fiber interaction. In general, synthetic organic fibers exert only a low order of fiber to fiber interaction but nevertheless the herein described treatments are beneficial as demonstrated by the following.

Nylon tire cord (Nylon 66), rayon tire cord and polyester tire cord are broken into short pieces of fiber filament by passing the cord through a tight rubber mill. The openings between the rolls are 2 mil, 12 mil and 8 mil, respectively. The fibers are now fiber filaments 2–3 mm. long. Each fiber, in amount of 50 parts by weight, is slurried in 3,000 ml. of water in a high speed Waring blender. To the slurry 12.5 parts by weight of styrene-butadiene copolymer latex is added and stirring continued for 3 minutes. The fiber is filtered and dried at room temperature. The treated particulate fiber is then mixed with rubber and other ingredients in a Brabender mixer to prepare vulcanizable composites of the composition described below. Similar composites are prepared from untreated fiber. The styrene-butadiene copolymer is an oil-extended rubber containing about 37.5 percent highly aromatic oil (SBR 1712). The control composite and the treated fiber composite contain the same proportions of fiber. Thus, the 82.5 parts by weight of treated fiber is composed of 75 parts by weight of fiber and 7.5 parts by weight of the coating material. The resorcinol derived resin added as a bonding ingredient is prepared as follows: A solution of 220 grams (2 moles) of resorcinol in 400 ml. of xylene is prepared and heated to 120°C. Allyl chloride (2 moles)

is then added and after the reaction is complete, the upper solvent layer is decanted and the residual solvent is removed by heating the remaining reaction mixture in vacuo. The ultimate composition of the vulcanizable composites comprises:

|  | Parts by Weight | |
| --- | --- | --- |
| Natural rubber | 50.0 | 50.0 |
| Styrene-butadiene copolymer rubber (23.5% bound styrene) | 68.8 | 68.8 |
| Carbon black (FEF) | 50.0 | 50.0 |
| Zinc oxide | 3.0 | 3.0 |
| Stearic acid | 2.0 | 2.0 |
| Untreated fiber | 75.0 | — |
| Treated fiber | — | 82.5 |
| Hexamethylenetetramine | 1.0 | 1.0 |
| Sulfur | 2.0 | 2.0 |
| N-*tert*-butyl-2-benzothiazolesulfenamide | 1.0 | 1.0 |
| N-(1,3-dimethylbutyl)-N'-phenyl-*p*-phenylenediamine | 2.0 | 2.0 |
| Resorcinol derived resin | 5.0 | 5.0 |

The fiber is oriented and the composition sheeted by repeated passes of the Brabender mixes through a rubber mill, the rolls of which are set at 0.07 inches (1.8 mm) and the oriented composite cured in a press at 153°C. The physical properties of the vulcanizates are determined in the direction of orientation of milling. Comparison of the composites containing the fiber treated to reduce fiber to fiber interaction and the corresponding control prepared from the same fiber but without fiber treatment shows significant improvement from fiber treatment as evident from the results summarized below.

The polyvinyl alcohol composites are prepared from polyvinyl alcohol tire cord chopped to lengths of about ¼ in. (6–7 mm). Treating is effected by slurrying 60 parts by weight of the chopped fiber, 6 parts by weight of the resorcinol derived resin and 3,000 parts by weight of water for 2 minutes at high speed in a Waring blender, adding 15 parts by weight of styrene-butadiene-vinyl pyridine latex (41 percent solids) and continuing the mixing for 3 minutes. The fibers are filtered and dried as before. The composition of the composite is the same as for the composites of other fibers except that the 5 parts of resorcinol derived resin is omitted although a quantity is, of course, present in the fiber coating.

1. The process of treating fiber for making high modulus elastomeric composites which comprises dispersing discontinuous organic fiber having an average aspect ratio of at least about 20 but not more than about 350 in aqueous medium having elastomer dispersed therein to reduce fiber to fiber interaction, coagulating the elastomer on the dispersed fiber and drying to a particulate fiber composition the fiber of which is of diminished fiber to fiber interaction and dispersible upon mixing the composition with massed elastomer.

2. The process of claim 1 in which the discontinuous fiber is cellulose.

3. The process of claim 1 in which the elastomer is a latex.

4. The process of claim 1 in which the fiber is first dispersed in water and latex of an elastomer is added.

5. The process of claim 1 in which the fiber is unregenerated wood cellulose and drying is carried to a point such that moisture up to 10 percent by weight of the dry fiber is present sufficient to inhibit fiber breaking.

6. The process of claim 4 in which the fiber is rayon.

7. The process of claim 4 in which coagulation is induced by shear.

8. The process of claim 5 in which a bonding ingredient for fiber to matrix is added to the aqueous medium.

9. The process of claim 8 in which the bonding ingredient comprises a resorcinol derived resin.

10. The process of treating fiber for making high modulus elastomeric composites which comprises treating discontinuous unregenerated wood cellulose fiber having an average aspect ratio of at least about 50 but not more than about 350 with an agent to reduce fiber to fiber interaction and with liquid plasticizer for the fiber different from said agent and forming fiber treated with said plasticizer in amount sufficient to inhibit fiber breaking and intermixed with said agent in amount sufficient to reduce fiber to fiber interaction on mixing with massed elastomer.

11. The process of claim 10 in which the agent to reduce fiber to fiber interaction is elastomer.

12. The process of claim 11 in which the elastomer is diene hydrocarbon rubber.

| Fiber | Max. Tensile Strength (psi) 0° Direction | Ult. Elong. % | Young's Modulus (psi) 0° Direction |
| --- | --- | --- | --- |
| Untreated nylon | 3770 | 21.0 | 28,000 |
| Coated nylon | 3960 | 20.0 | 30,000 |
| Untreated rayon | 3600 | 10.0 | 50,000 |
| Coated rayon | 4060 | 9.0 | 51,500 |
| Untreated polyester | 5500 | 20.0 | 51,000 |
| Coated polyester | 6700 | 22.0 | 68,000 |
| Untreated polyvinyl alcohol | 3650 | 13.5 | 36,500 |
| Coated polyvinyl alcohol | 5250 | 14.0 | 61,000 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exlusive property or privilege is claimed are defined as follows:

13. The process of claim 11 which includes the further step of mixing the treated fiber with bonding ingredient and elastomeric vulcanizable matrix in an internal mixer the rate of shear being sufficiently low to minimize fiber breaking, positioning the fiber in the matrix in a selected manner and vulcanizing to a vulcanized composite in which the organic fiber is bonded to the matrix and has an average aspect ratio within the range of 20 to 350.

14. The process of claim 10 in which one of the materials for treating the fiber is extender oil.

15. The process of claim 10 in which the agent to reduce fiber to fiber interaction is particulate solid.

16. The process of claim 15 in which the agent is carbon black.

17. The process of claim 10 in which the wood cellulose fiber is subjected to shearing forces in the presence of an agent to reduce fiber to fiber interaction which is normally solid when dry.

18. Material for reinforcing a matrix comprising dispersive particulate composition of unregenerated wood cellulose fiber of aspect ratio within the range of 20–350, liquid plasticizer for the fiber in amount sufficient to inhibit breaking the fiber on incorporating into a matrix, the fiber being treated with an agent different from the plasticizer which reduces fiber to fiber interaction, said agent being present in amount sufficient to inhibit fiber to fiber interaction on incorporating into a matrix, any adjuvant for adhering cellulose to a matrix, if present, being of a kind and condition compatible with said dispersive and reduced fiber to fiber interaction properties.

19. Reinforcing material of claim 18 in which the plasticizer is moisture up to about 10 percent of the weight of the dry cellulose.

20. Reinforcing material of claim 18 in which the agent different from the plasticizer is a coating of uncured diene elastomer.

21. Reinforcing material of claim 20 in which an adjuvant for adhering cellulose to a matrix is present.

22. Reinforcing material of claim 18 which contains extender oil.

23. Reinforcing material of claim 21 in which the adjuvant for adhering cellulose to a matrix is resorcinol derived resin.

24. The process of claim 1 in which the discontinuous fiber is cellulose and the elastomer is a latex.

* * * * *